United States Patent [19]

Heine

[11] 4,337,957
[45] Jul. 6, 1982

[54] WAGON TO SLED CONVERSION KIT

[75] Inventor: Charles A. Heine, Arnold, Mo.

[73] Assignee: Bertha E. Heine, Arnold, Mo.

[21] Appl. No.: 216,773

[22] Filed: Dec. 15, 1980

[51] Int. Cl.³ ............................................. B62B 19/04
[52] U.S. Cl. ..................................... 280/7.14; 280/14
[58] Field of Search ...................... 280/7.1, 7.12, 7.14, 280/8, 9, 13, 14

[56] References Cited

U.S. PATENT DOCUMENTS

| 1,268,229 | 6/1918 | Frank | 280/7.14 |
| 1,274,889 | 8/1918 | Johnson | 280/87.04 A |
| 1,389,418 | 8/1921 | Arner | 280/7.14 |
| 2,492,965 | 1/1950 | Carr | 280/7.14 X |
| 2,595,839 | 5/1952 | Gellenbeck | 280/7.12 |
| 2,950,924 | 8/1960 | Gantz | 280/7.12 X |
| 3,048,417 | 8/1962 | Breen | 280/87.01 X |
| 3,116,935 | 1/1964 | Mitchin et al. | 280/7.1 |

FOREIGN PATENT DOCUMENTS 423784  4/1911  France ......................... 280/87.04 B Primary Examiner—Joseph F. Peters, Jr.
Assistant Examiner—Michael Mar
Attorney, Agent, or Firm—Cohn, Powell & Hind

[57] ABSTRACT

This conversion kit provides for converting a conventional child's wagon into a sled and includes front and rear runners mounted for limited rotation on the wagon wheel axles in place of the wheels. The wagon towing handle is replaced with a sled tow bar and a longitudinally adjustable deck is removably attached to the wagon body.

9 Claims, 8 Drawing Figures

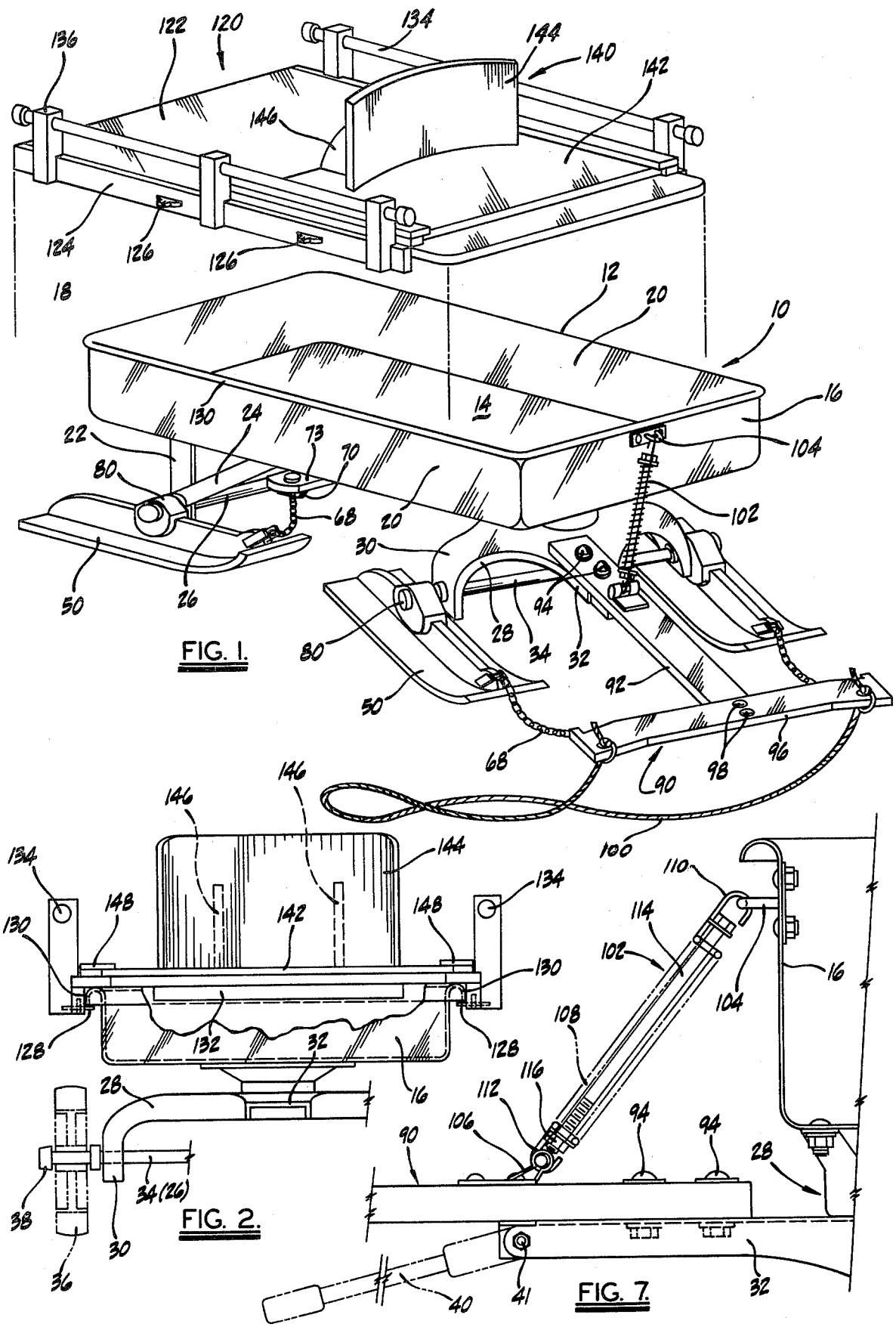

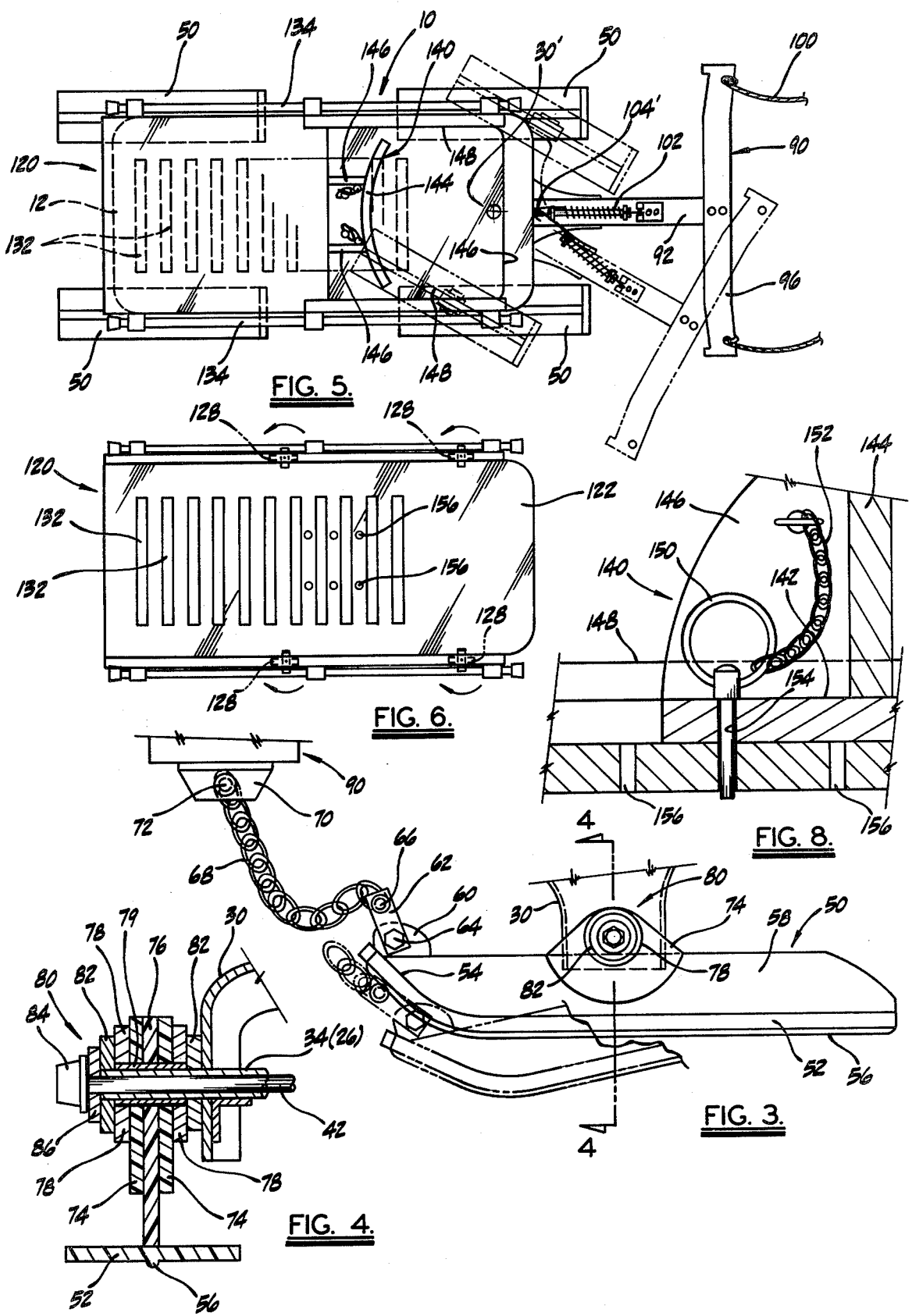

4,337,957

WAGON TO SLED CONVERSION KIT

BACKGROUND OF THE INVENTION

This invention relates generally to sleds and particularly to a conversion kit for converting a child's wagon into a sled.

The general idea of converting a wagon into a sled by removing the wagon wheels and substituting them by sled runners is known and is disclosed in several U.S. Patents, for example U.S. Pat. No. 2,950,924 and U.S. Pat. No. 1,409,501. The first of these two patents discloses a sled having rigidly fixed runners. The second patent discloses a sled having rotatable runners. The disadvantage of fixed runners is that they cannot adapt to the contours of the ground. The disadvantage of runners which are free to rotate is that they lack the necessary runner control.

One of the disadvantages in converting a conventional child's wagon into a sled is that, although the open-box form of the wagon body is very convenient for use in carrying various articles when the wagon is used for wheeled transportation, this configuration does not lend itself to providing comfort for the occupant of the sled. Nor is the towing handle provided on a conventional wagon ideally suited for controlling a sled.

The disadvantages discussed above are overcome by the present conversion kit in a manner not disclosed in the known prior art.

SUMMARY OF THE INVENTION

This wagon to sled conversion kit provides a set of runners which can be mounted in place of the wagon wheels to provide a steerable sled.

The conversion kit is intended for use with a child's wagon of the type having a bottom wall, sidewalls and an open top and having a rear axle with a pair of rear wheels mounted to a fixed wheel support, and a front axle with a pair of front wheels mounted to a pivotable hitch support. The kit comprises a pair of rear runners and a pair of front runners; each runner including an elongate, relatively wide ground-engaging lower member having an upturned forward end; an axle-receiving pivot connection disposed intermediate the ends of said lower member and rotational limiting means permitting, but limiting rotation of the runner relative to the wagon.

It is one aspect of the invention to provide runners which include a web portion and a relatively thick boss providing the runner pivot connections.

It is another aspect of the invention to provide rotation limiting means that include a flexible element connected between the front end of the runners and another, relatively fixed, part of the converted wagon.

It is a further aspect of the invention to provide a tow bar having a forwardly disposed cross bar connected to the pivotable hitch support and providing means limiting movement of the tow bar relative to the wagon.

It is still another aspect of the invention to provide a deck cover adjustable lengthwise of the wagon and having an adjustable seat portion.

It is another aspect of the invention to provide the deck cover with a plurality of pivotable latch elements engaging with the wagon sidewalls to hold the deck cover in position on the wagon.

BRIEF DESCRIPTION OF THE DRAWINGS

FIG. 1 is a perspective view of a sled converted from a child's conventional four wheel wagon;

FIG. 2 is a front view showing the deck in position on the wagon body;

FIG. 3 is an enlarged fragmentary side elevational view of a sled runner;

FIG. 4 is a cross sectional view of said runner taken on line 4—4 of FIG. 3;

FIG. 5 is a plan view of the sled;

FIG. 6 is a plan view showing the underside of the deck;

FIG. 7 is an enlarged detail showing the resilient connection between the wagon body and the sled tow bar, and FIG. 8 is an enlarged detail of the adjustable connection between the seat and the deck cover.

DESCRIPTION OF THE PREFERRED EMBODIMENT

Referring now by reference numerals to the drawings, and first to FIG. 1, it will be understood that the sled is converted from a conventional child's wagon 10 having a body 12 consisting essentially of a bottom wall 14, front and rear sidewalls 16 and 18 and longitudinal sidewalls 20 defining an essentially open box structure. The wagon 10 also includes a rear wheel support consisting of a vertical member 22 and a brace member 24 which provide a fixed wheel support for a rear axle 26. The wagon 10 also includes a pivotable hitch support 28 including depending members 30 providing a mounting for a front axle 34 and a forwardly extending stub hitch 32.

The rear and front axles 26 and 34 are hollow and are fixedly attached, as by welding, to their respective support members 22 and 28. As shown in phantom outline each axle, prior to conversion, includes a pair of ground wheels 36 held in place by cap nuts 38. In addition, the stub hitch 32, prior to conversion, provides a mounting for an articulated tow bar handle shown in phantom outline by numeral 40. As will be readily understood the wheels 36 and tow bar handle 40 are removed prior to making the conversion with the kit components which will now be described.

The conversion kit includes a pair of rear runners 50 and a pair of front runners 50, the runners in the preferred embodiment being identical and formed of plastic, or other suitable material. As shown in FIGS. 3 and 4 each runner 50 includes an elongate, relatively wide, ground-engaging lower member 52 having an upturned front end 54 and a central guide rib 56. A web 58 is integrally formed with the bottom member 52 and includes a tongue 60 at its front end which is apertured to receive a clevis 62 attached thereto as by fastener 64. The clevis 62 includes a fastener 66 at its outer end receiving a chain 88 which constitutes a flexible element and, as shown in phantom outline, limits rotation of the runners. In the case of the front runners, the upper end of the chain 68 is connected to a bracket 70, fixedly attached to a tow bar 90 by means of a fastener 72. In the case of the rear runners, the upper end of the chain 68 is connected to a similar bracket 70 fixedly attached to a cross bar 73 bolted, or otherwise attached, to the wagon body 12.

The web 58 includes an intermediate portion 76 having arcuate reinforcing plates 74 and circular bearing plates 78 on each side, said reinforcing plates, web intermediate portion and bearing plates being integrally formed as by adhesive to provide a boss 80 having a bushing 79 receiving the hollow axle 34. Spacer washers 82 are provided on each side of the boss and a cap nut 84, provided with a washer 86 engageable with the end of the hollow axle 34, is connected to each end of the threaded rod 42, received within the hollow axle 26, to retain the runners 50 in rotatable relation on said axle.

As shown in FIGS. 1-7, the tow bar 90 includes an elongate member 92 attached, as by fasteners 94, to the stub hitch 32. The tow bar 90 also includes a cross bar 96 attached to member 92, as by fasteners 98, said cross bar 96 being apertured at the ends to provide attachment for a tow rope 100.

As shown in FIG. 7, a resilient connection member 102 extends between the wagon front sidewall 16 and the tow bar 90, said connection member being attached to the wagon sidewall by means of a U-bolt 104, and attached to the tow bar 90 by means of an apertured bracket 106 bolted, or otherwise fastened to the said tow bar. The resilient connection member 102 includes a tension spring 108 having hooked ends 110 and 112 attached respectively to the U-bolt 104 and the bracket 106. The connection member also includes a bolt 114 which is provided with a nut 116 at the remote end and constitutes a restraining rod. The free length of the bolt, between the underside of the head and the nut, is less than the distance between the spring attachment points but greater than the distance between the end coils of the spring against which the head and nut can operatively bear when the spring is extended, thereby limiting extension of the spring 106. Because of this structural arrangement of parts the rotation movement of the tow bar 90 about the pivot center of the wagon 10, shown in phantom outline in FIG. 5, is permitted but limited, it being understood that the spring length increases as the tow bar is rotated, due to the offset nature of the connection of of spring 104 to the wagon 10 and the rotational center of the stub hitch 30 as clearly shown by numerals 104' and 30' in FIG. 5. In addition, the limited axial extension permitted to the member 102 limits rotational downward movement of the tow bar 90 about pivot point 30'.

As shown in FIG. 1, the conversion kit includes a deck cover 120 which overfits the wagon body 12 and is removably connected thereto. In the preferred embodiment, the deck cover 120 includes a base member 122 having depending side element 124 which are slotted at 126 to receive pivoted L-shaped latch members 128. These latch members 128 as shown in FIGS. 2 and 6, can be rotated through ninety degrees (90°) to engage the upper lip portion 130 of the wagon longitudinal sidewalls 20. As shown in FIG. 6, the underside of the base member 122 is provided with a plurality of spaced transverse elements 132 which are selectively engageable with the wagon rear sidewall 18 and provide a means of longitudinally adjusting the deck cover 120 in relation to said wagon.

In the preferred embodiment shown, the deck cover 120 also includes opposed hand rails 134, attached to side members 124 as by posts 136, and a seat member 140. As shown in FIGS. 1,2 and 5 the seat member 140 includes a bottom portion 142 and a seat portion 144 attached to said bottom portion by means of brace brackets 146, said bottom portion being received in sliding relation within the guide tracks 148 provided at each side of the deck base member 122. As shown in FIG. 8, the location of the seat member 140 is determined by a pair of spaced pins 150, which are attached to the brace bracket 146 as by chains 152. The pins 150 are received within a pair of spaced apertures 154 provided in the seat bottom portion 142, and selectively aligned pairs of longitudinally spaced openings 156 provided in the deck base member 122, to permit adjustment of the seat member 140 relative to the deck cover 120.

It is thought that the structural features and functional advantages of this wagon conversion kit have become fully apparent from the foregoing description of parts, but for completeness of disclosure, the installation of the kit components will be briefly described.

As shown in FIG. 2 the wagon 12, with which the preferred embodiment of the conversion kit is to be used, includes hollow shafts 34 and 26 which are fixedly attached to their associated front and rear supports 28 and 22 respectively. Wheels 36, shown in phantom outline, are removed from said fixed axles by removing cap nuts 38. When this has been achieved a shaft 42, threaded at each end, is inserted within each axle and the front and rear runners 50 are mounted to the ends of their associated shafts with their appropriate spacer washers 82. A cap nut 84 provided with a washer 86 is attached to each rod end and bearing against the end of the associated hollow axle, such that the runners 50 are free to rotate. Chains 68 are connected between the front end of each runner 50 and the connection point provided on the wagon body 12 and the tow bar 90 to limit, but not prevent, rotation of said runners. As shown in FIG. 7 the tow bar 90 and the eye bolt 104 are attached to the wagon front sidewall 16 and the stub hitch 32 respectively, a pair of holes being drilled in said front sidewall and said stub hitch to provide for such attachment. The resilient connection member 102 is then hooked into place between the U-bolt 104 and the bracket 106.

As shown in FIGS. 2, 5 and 8 the seat member 140 is slidingly received within the overlapping tracks 148 and attached at a selected location by means of pins 150. The deck cover 120 as a whole, with the latch elements 128 rotated into a clearance position, as shown in FIG. 1, can then be fitted onto the wagon body 12 at the desired longitudinally adjusted position determined by the selected transverse member 132 engagement with the wagon rear sidewall 18 and the latches 128 rotated into an engagement position below the wagon sidewall lip 130 as shown in FIG. 2. As will be readily understood the seat member 140 can be adjusted longitudinally independently of the adjustable deck cover 120 which, in effect, provides for both coarse and fine seating adjustment.

The conversion of the wagon into a sled is now complete and ready for use. In use, the provision of independent front and rear runners provides that the sled can be easily steered within the limits determined by the resilient connection member 102. Further, the provision of the chains 68 limiting rotation of the runners 50 permits the sled to adapt to varying ground contours.

When it is desired to convert the sled back into a wagon, it is a simple matter of removing the runners 50 and the threaded rods 42 and replacing them with wheels 36. The tow bar 90 is readily removed together with the resilient member 102 and the wagon towing handle 40 easily replaced by reconnecting with pivot fastener 41. The deck cover 120 is removed by simply rotating the latch elements 128 and lifting the deck cover clear of the wagon.

I claim as my invention:

1. A conversion kit for a wagon of the type having a bottom wall, sidewalls, and an open top and having a rear axle and a pair of rear wheels mounted to a fixed wheel support and a front axle and a pair of front wheels mounted to a pivotable hitch support, the kit comprising:
   (a) a tow bar having a forwardly disposed cross bar connected to the pivotable hitch support
   (b) a pair of rear runners and a pair of front runners, each runner including:
      1. an elongate, relatively wide ground-engaging lower member having an upturned forward end,
      2. an axle-receiving pivot connection disposed intermediate the ends of said lower member, and
      3. means limiting rotation of the lower member relative to the wagon but permitting substantially free rotation of the lower member within the rotation limits said rotation limiting means including means extending between the front runners and the crossbar on opposite sides of the tow bar.

2. A conversion kit for a wagon as defined in claim 1, in which:
   (c) each runner includes a web portion and a relatively thick boss having a bushing providing the pivot connection.

3. A conversion kit for a wagon as defined in claim 2, in which:
   (d) the attachment means for each runner includes a rod received within the associated wagon axle and projecting outwardly of the axle, the rod being received by the boss bushing of each runner, each rod having opposed nut-receiving ends for fastening the runners to the rod.

4. A conversion kit for a wagon as defined in claim 1, in which:
   (c) the tow bar includes resilient means between the tow bar and wagon permitting but limiting horizontal and vertical movement of the tow bar relative to the wagon, and
   (d) the resilient means includes a tension spring, having attachment means at each end, one of said attachment means being connected to the tow bar and the other of said attachment means being connected to the wagon front sidewall, and a restraining rod received by the spring, said rod having stop means at each end spaced apart a greater distance than the length between spring end coils to permit limited extension of the spring.

5. A conversion kit for a wagon as defined in claim 1, in which:
   (c) an upper deck cover is removably attached to the wagon sidewalls to provide a seat above the bottom wall.

6. A conversion kit for a wagon as defined in claim 5, in which:
   (d) the deck cover includes a plurality of transverse adjustment elements disposed in spaced relation lengthwise of the wagon, said elements being engageable with the wagon rear sidewall to selectively determine the position of the deck cover longitudinally on the wagon.

7. A conversion kit for a wagon as defined in claim 5, in which:
   (d) the deck cover includes a base member having guide tracks and a removable seat member, said seat member having a bottom portion engageable in sliding relation with base member at the guide tracks and a backrest portion.

8. A conversion kit for a wagon as defined in claim 7, in which:
   (e) the seat bottom portion includes pin means and the base member includes a plurality of longitudinally spaced openings receiving said pin means to selectively determine and retain the position of the seat member relative to the deck cover.

9. A conversion kit for a wagon as defined in claim 5, in which:
   (e) the wagon sidewalls include upper marginal lips, and
   (d) the deck cover includes a plurality of pivotable latch elements engageable with the wagon sidewall lips to hold the deck in position on the wagon.

* * * * *